United States Patent
Bird (10) Patent No.: US 11,128,209 B2
(45) Date of Patent: Sep. 21, 2021

(54) MAGNETIC GEARBOX WITH FLUX CONCENTRATION HALBACH ROTORS

(71) Applicant: Portland State University, Portland, OR (US)

(72) Inventor: Jonathan Bird, Portland, OR (US)

(73) Assignee: Portland State University, Portland, OR (US)

( * ) Notice: Subject to any disclaimer, the term of this patent is extended or adjusted under 35 U.S.C. 154(b) by 89 days.

(21) Appl. No.: 16/494,634

(22) PCT Filed: Mar. 16, 2018

(86) PCT No.: PCT/US2018/022980
§ 371 (c)(1),
(2) Date: Sep. 16, 2019

(87) PCT Pub. No.: WO2018/170461
PCT Pub. Date: Sep. 20, 2018

(65) Prior Publication Data
US 2020/0091809 A1    Mar. 19, 2020

Related U.S. Application Data (60) Provisional application No. 62/472,260, filed on Mar. 16, 2017, provisional application No. 62/488,742, filed on Apr. 22, 2017.

(51) Int. Cl.
*H02K 49/10* (2006.01)

(52) U.S. Cl.
CPC ................. *H02K 49/102* (2013.01)

(58) Field of Classification Search
CPC ...... H02K 49/00; H02K 49/10; H02K 49/102; H02N 11/00
See application file for complete search history.

(56) References Cited

U.S. PATENT DOCUMENTS

| | | | |
|---|---|---|---|
| 5,783,893 A | * | 7/1998 | Dade ................ H02K 16/00 310/114 |
| 9,013,081 B2 | | 4/2015 | Atallah et al. |
| 9,559,577 B2 | * | 1/2017 | Bird .................. H02K 49/102 |

(Continued)

FOREIGN PATENT DOCUMENTS

| | | |
|---|---|---|
| CN | 102420549 | 4/2012 |
| CN | 106300889 | 1/2017 |

OTHER PUBLICATIONS

International Search Report and Written Opinion dated Jul. 19, 2018, from International Patent Application No. PCT/US2018/022980, 12 pp.

*Primary Examiner* — Tran N Nguyen
(74) *Attorney, Agent, or Firm* — Klarquist Sparkman, LLP (57) ABSTRACT

This application relates to translating mechanical energy from a low-speed rotor to a high-speed rotor or vice versa in a magnetic gearbox. More specifically, this application discloses various embodiments of a coaxial magnetic gearbox with flux concentration Halbach rotors. In certain implementations, the device further comprises a circular back iron (or other ferromagnetic material) disposed concentrically along the axis of the cylindrical magnetic gearing device. In such embodiments, this flux concentration back iron (or ferromagnetic pole) improves the torque density and can also help retain the magnets in place.

9 Claims, 11 Drawing Sheets

(56) References Cited

U.S. PATENT DOCUMENTS

| | | |
|---|---|---|
| 9,641,059 B2 * | 5/2017 | Bird ................... H02K 49/102 |
| 2003/0102764 A1 * | 6/2003 | Kusase ................ H02K 7/006 |
| | | 310/266 |
| 2004/0066107 A1 | 4/2004 | Gery |
| 2015/0075886 A1 * | 3/2015 | Tonari .................... B60K 6/36 |
| | | 180/65.245 |
| 2017/0005560 A1 | 1/2017 | Bird |

* cited by examiner

MAGNETIC GEARBOX WITH FLUX CONCENTRATION HALBACH ROTORS

CROSS-REFERENCE TO RELATED APPLICATIONS

This application is the U.S. National Stage of International Application No. PCT/US2018/022980, filed Mar. 16, 2018, and entitled "MAGNETIC GEARBOX WITH FLUX CONCENTRATION HALBACH ROTORS," which was published in English under PCT Article 21(2), which in turn claims the benefit of U.S. Provisional Application No. 62/472,260 filed on Mar. 16, 2017, and entitled "COAXIAL MAGNETIC GEARBOX", and the benefit of U.S. Provisional Application No. 62/488,742 filed on Apr. 22, 2017, and entitled "MAGNETIC GEARBOX WITH FLUX CONCENTRATION HALBACH ROTORS," both of which are hereby incorporated herein by reference in their entirety.

ACKNOWLEDGMENT OF GOVERNMENT SUPPORT

This invention was made with government support under Grant/Contract No. DE-EE0006801 awarded by The United States Department of Energy (DOE). The government has certain rights in the invention.

FIELD

This application relates to translating mechanical energy from a low-speed rotor to a high-speed rotor and vice versa in a magnetic gearbox.

BACKGROUND

For many applications, it can be desirable to convert low-speed mechanical energy (e.g., rotational or translational energy) from a first rotor to high-speed mechanical energy (e.g., rotational or translational energy) in a second rotor. Likewise, there are applications in which it can be beneficial to work in the opposite direction, converting high-speed mechanical energy from the second rotor into low-speed mechanical energy in the first rotor. In this application, the mechanical energy under consideration is predominantly rotational energy translated between two or more rotors, although this needn't always be the situation. One example motivation for performing some of the above-mentioned tasks is to translate torque in either direction between the first low-speed rotor and the second high-speed rotor, the translation occurring in accordance with a predetermined gear ratio. In a rotational gear, "speed" usually refers to angular velocity.

Mechanical gear systems often employ radial discs (or gears) of differing diameters that are formed with teeth (also known as cogs) along their outer circumferences. The pitch of the teeth surrounding each gear are often matched so that two or more gears can mesh fluidly and thus move smoothly in conjunction with and relative to one another. In such a configuration, a large diameter gear will tend to rotate more slowly than a smaller diameter gear to which it is coupled, causing a change in the rotational velocity of the smaller gear relative to the larger gear based on a predetermined gear ratio. Importantly, an accompanying translation of torque can also occur between the gears in accordance with the predetermined gear ratio. Other gear systems exist which can convert various permutations of rotational energy, translational energy, and even stored energy (batteries, springs, fuel cells, etc.) into one another. These systems are also frequently reversible, meaning that the transformed energy can flow in both directions (e.g., from a circular gear to a linear piston, and vice-versa). A by-product of this translation is that torque may also be transferred in a stepped-up or stepped-down fashion into a larger or smaller torque, or even into a stepped-up or stepped-down linear force. Some other systems can convert linear motion into stepped-up or stepped-down linear motion or rotational motion, where one gear can have a differing velocity or translational force than a mating gear, and thus the potential force exerted by one gear can be made to be greater or less than the force exerted by the mating gear.

In each of the above-mentioned systems, however, some degree of mechanical wear is usually exerted on each of the gears owing to the physical contact between the components. This wear can require various maintenance tasks to be performed to keep the system in working condition, such as lubricating the gears, replacing various parts and components, or any other number of servicing tasks (painting, sealing, etc.). These constraints can make geared systems both costly and complex.

Accordingly, there is a desire for contact-less gear assembly that uses electromagnetic forces as opposed to physical forces to perform the required energy translation.

SUMMARY

Disclosed herein are representative embodiments of methods, apparatus, and systems for implementing a coaxial magnetic gearbox with flux concentration Halbach rotors.

Figure 16:
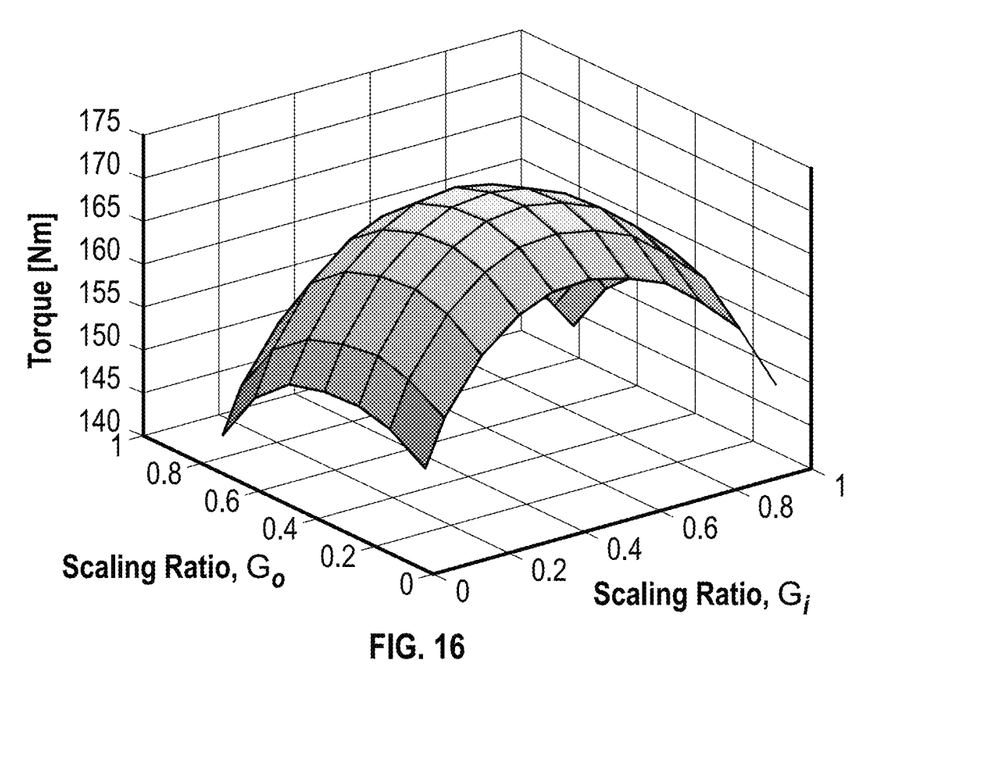
FIG. 16 is a graph illustrating the influence of an inner rotor scaling ratio, $\Gamma_i$ and an outer rotor scaling ratio, To, on the peak torque.

1. In one example embodiment, a cylindrical magnetic gearing device is disclosed comprising an outer cylinder having an outer circumference and an inner circumference, and an inner rotor having an outer circumference and an inner circumference. Further, in this embodiment, the outer cylinder comprises a first plurality of magnetic pole pairs disposed along the outer cylinder, wherein the first plurality of magnetic pole pairs extends radially between the inner circumference and the outer circumference of the outer cylinder; a second plurality of magnetic pole pairs disposed along the outer circumference of the outer cylinder, each respective pole of the second plurality of magnetic pole pairs being interspersed between respective poles of the first plurality of magnetic pole pairs, wherein the polarities of the second plurality of magnetic pole pairs are substantially orthogonal to the polarities of the first plurality of magnetic pole pairs; and a first plurality of ferromagnetic pole pieces disposed along the inner circumference of the outer cylinder and interspersed between respective poles of the first plurality of magnetic pole pairs. Further, the inner cylinder can comprise a third plurality of magnetic pole pairs disposed along the inner rotor, wherein the third plurality of magnetic pole pairs extends radially between the inner circumference and the outer circumference of the inner rotor; a fourth plurality of magnetic pole pairs disposed along the inner circumference of the inner rotor, each respective pole of the second plurality of magnetic pole pairs being interspersed between respective poles of the third plurality of magnetic pole pairs, wherein the polarities of the fourth plurality of magnetic pole pairs are substantially orthogonal to the polarities of the third plurality of magnetic pole pairs; and a second plurality of ferromagnetic pole pieces disposed along the outer circumference of the inner rotor and interspersed between respective poles of the third plurality of magnetic pole pairs. Still further, the cylindrical magnetic gearing device of this embodiment comprises a cage rotor disposed between the outer cylinder and inner rotor, and separated from the outer cylinder and inner rotor by air gaps. Additionally, a magnetic flux density in the air gaps is substantially confined by the first and second plurality of ferromagnetic pole pieces. Also, in some implementations, the first plurality of ferromagnetic pole pieces and the second plurality of ferromagnetic pole pieces cooperatively increase torque density in the device (e.g., as illustrated in FIG. 16). In some implementations, each respective pole of the first plurality of magnetic pole pairs is evenly distanced by a first predetermined amount of space from respective neighboring poles of the first plurality of magnetic pole pairs. In certain implementations, each respective pole of the third plurality of magnetic pole pairs is evenly distanced by a second predetermined amount of space from respective neighboring poles of the third plurality of magnetic pole pairs. In some implementations, the outer cylinder is stationary, the inner rotor is a high-speed rotor, and the cage rotor is a low-speed rotor. In certain implementations, the outer cylinder contains a predetermined number of pole pairs $p_3$, the inner rotor contains a predetermined number of pole pairs $p_1$, and the cage rotor contains a discrete number of ferromagnetic poles $n_2$, where $n_2 = p_1 + p_3$. Further, the torque ratio between the inner rotor and the cage rotor can be given by $\omega_1 = \omega_2 (n_2/p_1)$. In some implementations, the first and second plurality of ferromagnetic pole pieces comprise iron. In certain implementations, the device further comprises a circular back iron disposed concentrically along the axis of the cylindrical magnetic gearing device, a portion of the back iron extending radially beyond an outer circumference of the first plurality of magnetic pole pairs. In some implementations, the device further comprises further comprising a circular ferromagnetic ring disposed concentrically along the axis of the cylindrical magnetic gearing device, a portion of the circular ferromagnetic ring extending radially beyond an outer circumference of the first plurality of magnetic pole pairs.

Another disclosed embodiment is a system configured to convert rotational energy between an outer cylinder, an inner rotor, and a cage rotor, the system comprising: an array of permanent magnets disposed on the outer cylinder and periodically separated by outer cylinder ferromagnetic pole pieces, an array of permanent magnets disposed on the inner rotor and periodically separated by inner rotor ferromagnetic pole pieces, and a cage rotor disposed between the outer cylinder and inner rotor, the cage rotor being separated from each of the outer cylinder and the inner rotor by first and second air gaps, respectively. In this embodiment, the outer cylinder ferromagnetic pole pieces and the inner rotor ferromagnetic pole pieces are configured to concentrate magnetic flux densities within the first and second air gaps. Also, in certain implementations, the outer cylinder ferromagnetic pole pieces and inner cylinder ferromagnetic pole pieces cooperatively increase torque density in the system (e.g., as illustrated in FIG. 16). In some implementations, the system further comprises an array of orthogonally polarized permanent magnets disposed circumferentially along the outer cylinder, the array of orthogonally polarized permanent magnets inhibiting a flow of magnetic flux from emerging beyond an extent of the outer cylinder. In certain implementations, the system further comprises an array of orthogonally polarized permanent magnets disposed circumferentially along the inner rotor, the array of orthogonally polarized permanent magnets inhibiting a flow of magnetic flux from emerging through the inner rotor. In some implementations, the ferromagnetic pole pieces comprise iron. In certain implementations, the system further comprises a back iron disposed concentrically along the axis of the system and in physical contact with the system, a portion of the back iron extending radially beyond the extent of the first plurality of magnetic pole pairs. Further, the back iron can extend radially inwards beyond the extent of the third plurality of magnetic pole pairs. In certain implementations, the system further comprises a ferromagnetic ring disposed concentrically along the axis of the system and in physical contact with the system, a portion of the back iron extending radially beyond the extent of the first plurality of magnetic pole pairs. In some implementations, the outer cylinder contains a predetermined number of pole pairs $p_3$, the inner rotor contains a predetermined number of pole pairs $p_1$, and the cage rotor contains a discrete number of ferromagnetic poles $n_2$, where $n_2 = p_1 + p_3$. Further, the torque ratio between the inner rotor and the cage rotor can be given by $\omega_1 = \omega_2 (n_2/p_1)$.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

I. General Considerations

Figure 4:
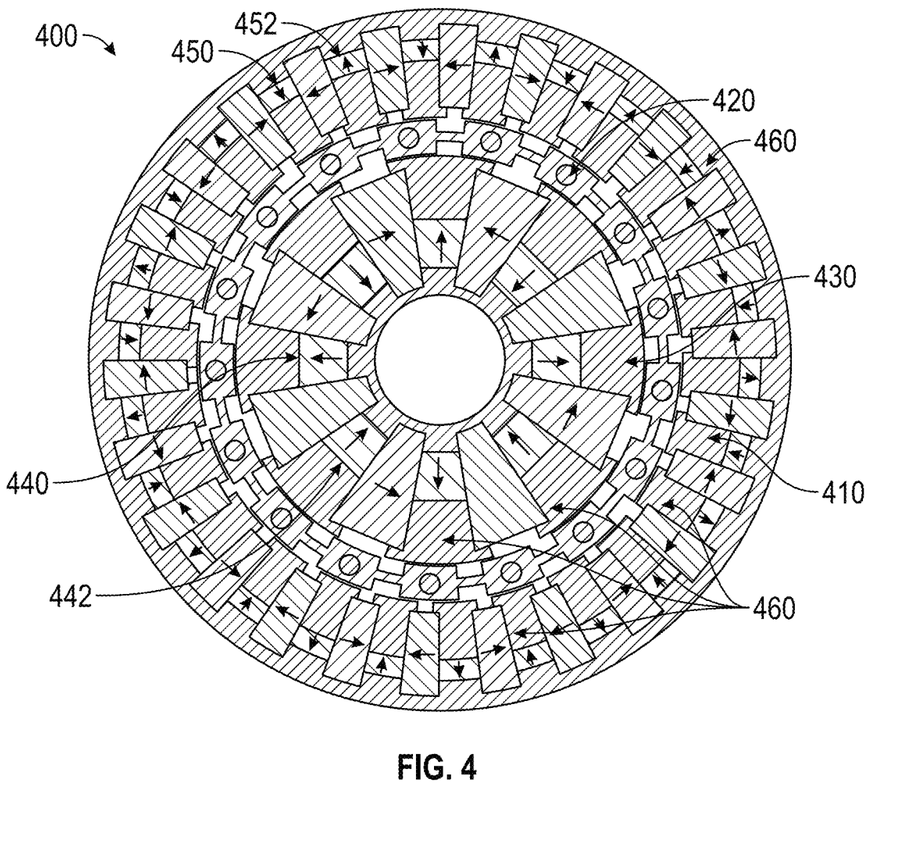
FIG. 4 depicts a cross-sectional view of a 4.25:1 flux concentration Halbach flux focusing magnetic gearbox design with an added back iron.

Disclosed below are representative embodiments of methods, apparatus, and systems for implementing a coaxial magnetic gearbox with flux concentration Halbach rotor magnetic gearboxes (FCH-MG) such as those illustrated as FCH-MG 100 in FIG. 1 and FCH-MG 400 in FIG. 4. The disclosed methods, apparatus, and systems should not be construed as limiting in any way. Instead, the present disclosure is directed toward all novel and nonobvious features and aspects of the various disclosed embodiments, alone or in various combinations and sub-combinations with one another. Furthermore, any features or aspects of the disclosed embodiments can be used in various combinations and sub-combinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

For the sake of simplicity, the attached figures may not show the various ways in which the disclosed methods, apparatus, and systems can be used in conjunction with other methods, apparatus, and systems. Additionally, as used herein, the term "and/or" means any one item or combination of any items in the phrase.

II. Introduction to the Disclosed Technology

Embodiments of the disclosed technology include a contact-less gear assembly that uses an electromagnetic (henceforth magnetic) gear system. An example of one such system is a Halbach array magnetic gearbox (MG). Generally, Halbach arrays are special arrangements of permanent magnets that augment the magnetic field on one side of the array while cancelling the field to near zero on the other side. In some applications, this effect is achieved by generating a spatially rotating pattern of magnetization within a magnetic gearbox (MG). The rotating pattern of permanent magnets (e.g., on the front face; on the left, up, right, down) can be continued indefinitely while the array continues to exhibit the same energy transfer effects. One useful pneumonic for a Halbach array is to envision placing multiple horseshoe magnets adjacent to each other with similar poles touching. This arrangement would create an additive magnetic flux density in a first direction (flux concentration) while simultaneously restricting the flux density in an opposite direction (flux rarefaction). By concentrating the magnetic flux density into preferred areas of a given assembly, a more efficient gearing system capable of translating greater quantities of torque, force, and energy can be realized.

Thus, Halbach arrays can be used to create high torque densities. Halbach array magnetic gearboxes (MGs) can usually exert as much force as a mechanical gear without rotor contact, allowing the MGs to be essentially immune to physical wear of the mating surfaces. Additionally, Halbach array MGs can have very low noise and can slip without damage, making them very reliable. Halbach array magnetic gearboxes can also be used in configurations that are not possible for gears that must be in physical contact, and can even operate with a barrier completely separating the driving force from the load. For example, a magnetically coupled gear can transmit forces into a hermetically sealed enclosure without using a radial shaft seal, which may leak (hermetically sealed processes are not contaminated or chemically affected by the magnetic gear). This can be an advantage in explosive or otherwise hazardous environments where leaks constitute a legitimate danger. However, Halbach arrays can also be difficult to mechanically assemble, and often the effective air-gap of the array must be made large in order to provide space for a retaining sleeve.

In this disclosure, example embodiments that use an additional ferromagnetic retaining pole within the Halbach array structure are disclosed. Using such flux concentration ferromagnetic poles can improve torque density and/or help retain the magnets in place.

III. Detailed Description of a Coaxial Magnetic Gearbox with Flux Concentration Halbach Rotors Magnetic gearboxes (MGs) often utilize the principle of magnetic field heterodyning to create a change in angular velocity between magnetically coupled gears. Typically, a heterodyning system creates new frequencies by combining (or mixing) two frequencies to shift one frequency range into another, new frequency range, and is usually involved in the processes of modulation and demodulation. These new frequencies are called heterodynes. The process of magnetic field modulation between rotors is a useful component to a flux concentration Halbach magnetic gearbox (e.g., FCH-MG 100 of FIG. 1 and FCH-MG 400 of FIG. 4) as further described below.

As previously stated, in a magnetic gearbox (MG), energy translation can be accomplished without the requirement for direct physical contact between the various internal components, such as gears, rotors, stators, actuators, translators, cylinders, etc. The translation of energy from linear to rotational, rotational to rotational, or linear to linear can be accomplished via force carrying electromagnetic fields generated between the various components, notably the MG rotors and/or MG magnets. Because the air-gap torque is created using only magnet field excitation, the torque density of a MG is not limited by the thermal limitations imposed by machines that rely on electrical current excitation principles, which can rapidly overheat given a particular current load.

A Halbach rotor assembly can be used to improve the torque density of a MG. However, in order to retain the individual Halbach rotor magnets in place, a mechanical rotor retaining sleeve was often required. The retaining sleeve can introduce numerous drawbacks to the Halback rotor assembly. For one, the retaining sleeve can increase the effective air-gap in the assembly. The increased air-gap can then undo much of the Halbach rotor benefits, such as canceling out most, if not all, of the torque density benefits in comparison with the more traditional rotor structure that do not require a retaining sleeve, because the fields in the air-gap are more widely dispersed, diluted, and/or otherwise attenuated. As the Halbach rotor is also significantly more difficult to assemble, the use of a Halbach rotor appears to primarily make sense in high-speed motor applications where a retaining sleeve and low harmonic content are already highly desirable.

To address these issues, a flux concentration Halbach (FCH) rotor having an additional flux concentration ferromagnetic steel pole added into the Halbach rotor can be used. An example of FCH rotors used in a MG structure is shown in FIG. 1 (FCH-MG 100). In FIG. 1, a cross-sectional view of a 4.25:1 flux concentration Halbach magnetic gearbox FCH-MG 100 is depicted. The illustrated high-speed inner rotor 130 depicts $p_1=4$ pole-pairs, with an outer rotor 110 having $p_3=13$ pole-pairs and a low-speed cage rotor 120 having $n_2=17$ ferromagnetic segments. It is useful to note that this configuration conforms to equation (1) below, as $n_2=17=p_1(4)+p_3(13)$. Additionally depicted in FIG. 1 are an example of an outer radial magnet 140 and an inner radial magnet 150. Portions shown in blue (a few examples of which are identified at 160 in FIG. 1 and at 480 in FIG. 4 and which can also be identified in FIG. 1 and FIG. 4 as being between the pole-pairs and not having an illustrated magnetic direction) represent ferromagnetic materials. In some embodiments, the blue portions represent iron, although they could also comprise any other form of ferromagnetic material such as ferromagnetic steel, neodymium compounds, nickel, cobalt, gadolinium, etc.

Figure 1:
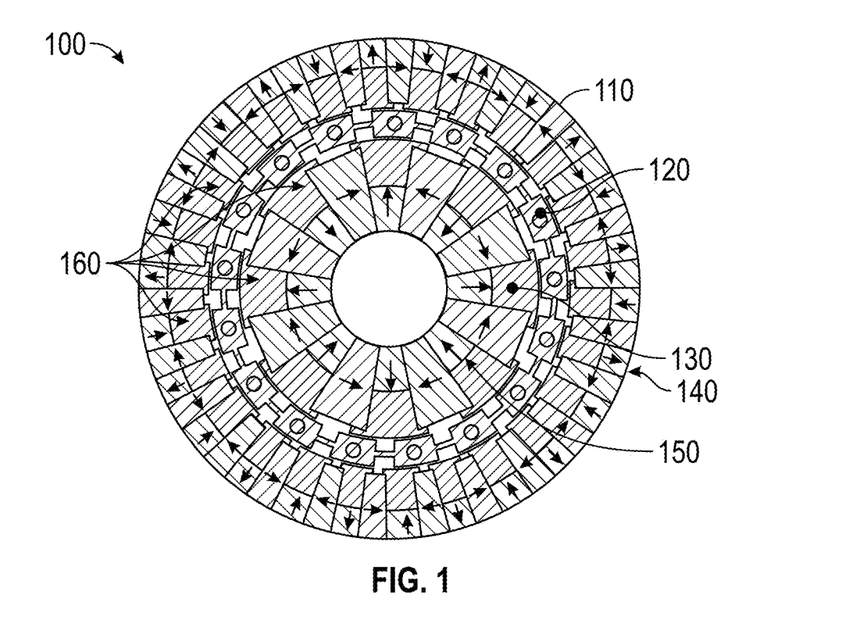
FIG. 1 depicts a cross sectional view of a 4.25:1 flux concentration Halbach magnetic gearbox.

By adding additional ferromagnetic pole pieces into the Halbach rotor structure FCH-MG 100 of FIG. 1, it becomes possible to construct a rotor assembly without the need for the mechanical retaining sleeve. Accordingly, a smaller air-gap may be maintained between rotors. This type of FCH structure was recently analyzed for use in a MG, with the result that the architecture was feasible, but included numerous drawbacks. For instance, the steel poles in the simulated design were selected to be 0.4 mm thick, which can be impractical to construct due to machining tolerances for thin materials, and further because a 0.4 mm thickness may be regarded as fragile and/or prone to malfunction. For these and other reasons, the general FCH-MG design of FIG. 1 is generally viewed as being impractical.

In this disclosure, example embodiments of an FCH-MG structure that address one or more of the drawbacks of the FCH-MG structure of FIG. 1 are disclosed.

III.A. Torque Transfer

In order for a coaxial MG to create a relative translation of energy (speed and/or torque) between the rotors, the fields created by the inner rotor 130 and outer rotor 110 can be modulated. This modulation process is referred to as magnetic heterodyning (or just heterodyning). If the number of high-speed rotor 130 pole-pairs is $p_1$ and the number of outer rotor 110 pole-pairs is $p_3$, and each satisfy a relationship according to Eq. 1:

$$n_2 = p_1 + p_3 \quad (1)$$

where $n_2$ is the number of ferromagnetic steel poles on the low speed rotor 120, then it can be shown that the magnetic fields can be coupled. The airgap fields can add and subtract resulting in a change in speed between rotors described by Eq. 2:

$$n_2 \omega_2 = p_1 \omega_1 + p_3 \omega_3 \quad (2)$$

where the subscripts denote rotor number (1—inner, high-speed rotor 130, 2—central, low-speed rotor 120, and 3—outer rotor 110). $\omega_n$ denotes the speed of any of the three rotors with n=1, 2, or 3.

Typically, the outer rotor is fixed (stationary, $\omega_3=0$). In this situation, the torque ratio can be expressed as:

$$\omega_1 = G_{12} \omega_2 \quad (3)$$

where $$G_{12} = \frac{n_2}{p_1}.$$

For the example FCH-MG 100 shown in FIG. 1, the gear ratio is $G_{12}=4.25$.

With $\omega_3=0$ the power relation between rotors can then be described by:

$$|T_1|\omega_1 - |T_2|\omega_2 = P_l \quad (4)$$

where $T_2$ and $T_1$ are the peak torques on rotor 2 (e.g., rotor 120) and rotor 1 (e.g., rotor 130), respectively, and $P_l$ are the total MG losses. The losses can be separated such that $$P_l = P_h + P_e + P_m \quad (5)$$

where $P_h$=hysteresis losses, $P_e$=eddy current losses, and $P_m$=mechanical losses (primarily due to bearings and windage). The active region volumetric torque density of a MG can be compared by using:

$$T_v = T_2/(\pi r_{o3}^2 d) \quad (6)$$

where $r_{o3}$ represents the outer radius of the MG and d represents the stack length.

III.B. Example Flux Concentration Halbach Rotor Designs

Table 1 (below) summarizes the MG parameters used for an example FCH-MG design 400 shown in FIG. 4. The design is based on a flux-focusing MG design 200 shown in FIG. 2, which depicts a flux focusing magnetic gearbox with 4.25:1 gear ratio. The inner, high speed rotor 230 has $p_1=4$ pole-pairs, the outer rotor 210 has $p_3=13$ pole pairs. The performance of the FCH-MG 400 was compared with the base design 200. A parameter sweep analysis when changing only the radial length of the inner and outer radial magnets 270 was conducted as shown in FIG. 3 for the FCH-MG 400 design. Based on this sweep analysis the outer and inner radial magnets 270 were selected to be 10 mm and 6 mm in radial length respectively.

TABLE 1

FLUX CONCENTRATION HALBACH MAGNETIC GEARBOX PARAMETERS

| | Description | Value | Unit |
|---|---|---|---|
| Inner rotor | Inner radius, $r_{i1}$ | 10.5 | mm |
| | Outer radius, $r_{o1}$ | 33.0 | mm |
| | Pole pairs, $p_1$ | 4 | — |
| | Angular span, $\theta_1$ | $\pi/(2p_1)$ | radians |
| | Radial length of radial magnet | 8.0 | mm |
| | Radial length of azimuth magnet | 18.6 | mm |
| Cage rotor | Inner radius, $r_{i2}$ | 33.5 | mm |
| | Outer radius, $r_{o2}$ | 39.5 | mm |
| | Pole pairs, $n_2$ | 17 | — |
| | Angular span, $\theta_2$ | 0.2443 | radians |
| | Connecting bridge, inner radius | 36 | mm |
| | Connecting bridge, outer radius | 37 | mm |
| | Rods, radius | 1.5875 | mm |
| Outer rotor | Inner radius, $r_{i3}$ | 40.0 | mm |
| | Outer radius, $r_{o3}$ | 57.0 | mm |
| | Pole pairs, $p_3$ | 13 | — |

TABLE 1-continued

FLUX CONCENTRATION HALBACH MAGNETIC GEARBOX PARAMETERS

| Description | Value | Unit |
|---|---|---|
| Angular span, $\theta_3$ | $\pi/(2p_3)$ | radians |
| Radial length of radial magnet | 4.0 | mm |
| Radial length of azimuth magnet | 14.0 | mm |
| Axial stack length, d | 75 | mm |

Figure 2:
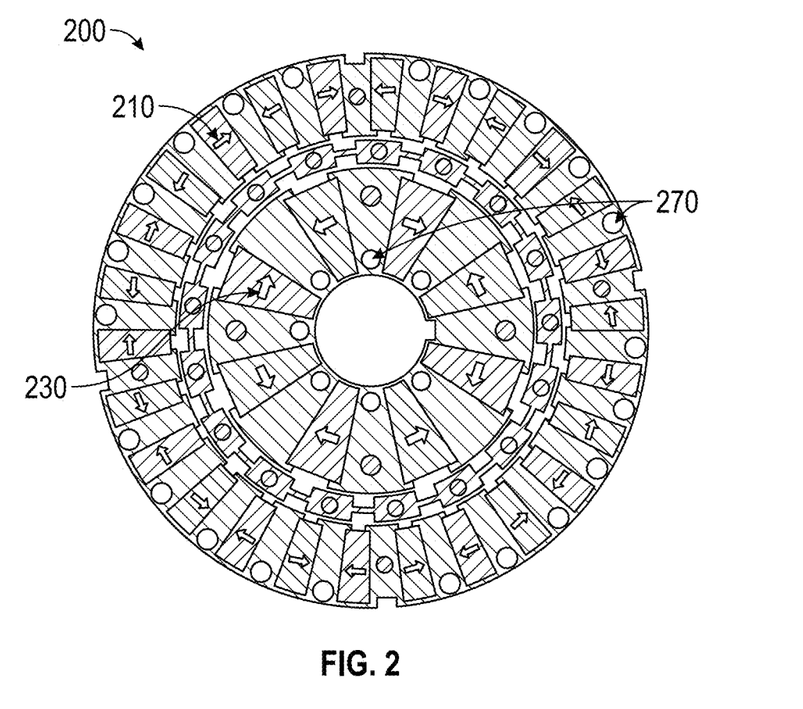
FIG. 2 depicts a flux focusing magnetic gearbox with 4.25:1 gear ratio.
Figure 3:
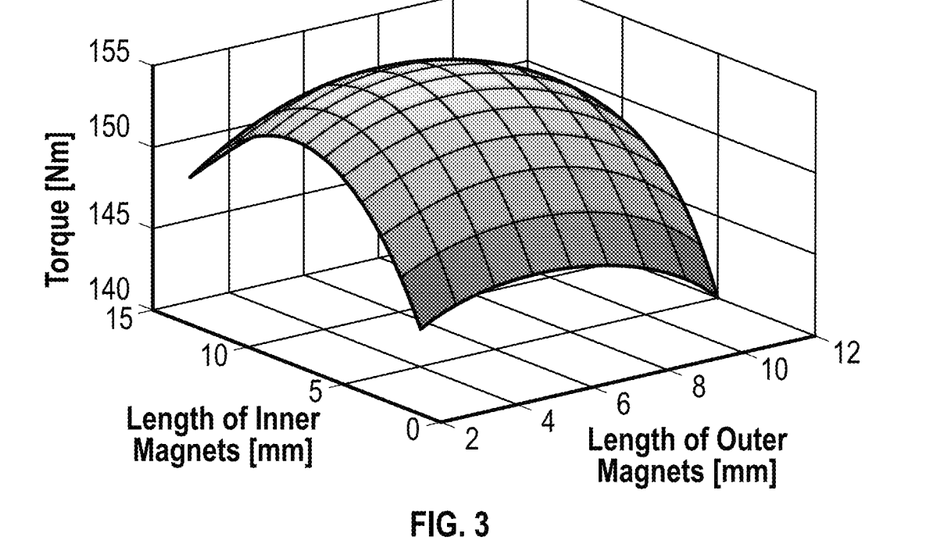
FIG. 3 illustrates an inner and outer rotor radial magnet length parameter sweep analysis.

Using finite element analysis (FEA), the peak torque for this FCH-MG 400 was calculated to be $T_2$=148.7 Nm (201 Nm/L) while the calculated peak torque for the flux focusing MG shown in FIG. 2 was $T_2$=103.1 Nm (139.5 Nm/L). This indicates that the FCH-MG 400 typology should significantly increase the torque density of the MG, however this will be at the cost of increasing mechanical construction and assembly complexity. In order to enable the FCH-MG 400 to be assembled more easily, a back iron 460 was added, as shown in FIG. 4. Although the back iron 460 is made of iron in this example, other ferromagnetic materials could be used for a ring disposed around the FCH-MG. Specifically, FIG. 4 depicts a cross-sectional view of the 4.25:1 FCH-MG 400 with the additional back iron 460. In the illustrated embodiment, the inner, high speed rotor 430 has $p_1$=4 pole-pairs, and the outer rotor 410 has $p_3$=13 pole pairs, although it should be understood that the number of pole pairs can vary from implementation to implementation.

Figure 5:
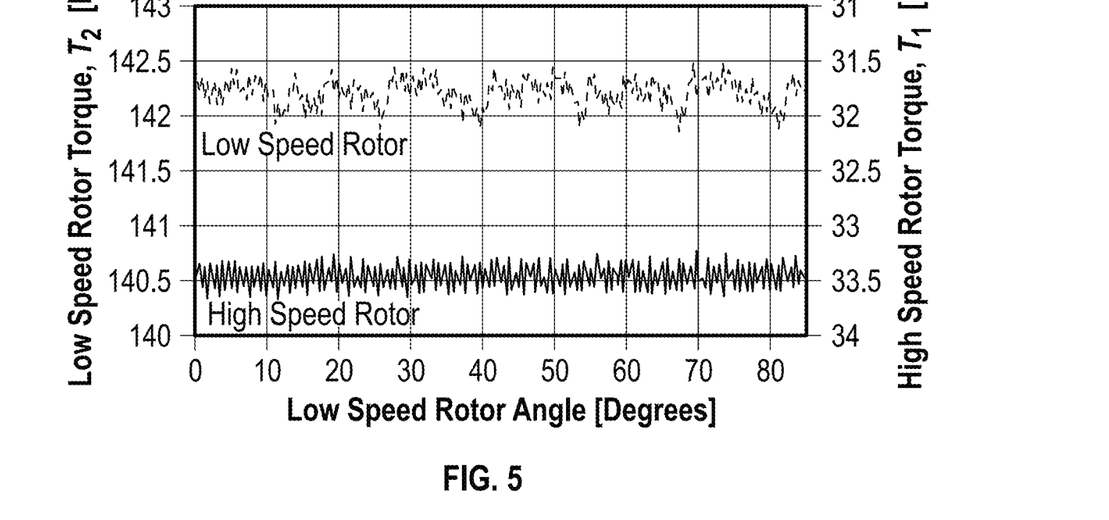
FIG. 5 is a graph illustrating torque as a function of low-speed rotor angle for the high and low speed rotors when operating at a calculated peak torque value.

The back iron 460 resulted in the radial magnets on the inner, high-speed rotor 430 (such as high-speed rotor radial magnets 440, 442) and outer rotor 410 (such as outer rotor radial magnets 450, 452) being reduced in length to 8 mm and 4 mm respectively. The back iron 460 also allowed these magnets to be made with rectangular and trapezoidal dimensions. These changes reduced the peak calculated torque to $T_2$=142.2 Nm (192.4 Nm/L). The peak torque as a function of angular position is shown in FIG. 5, which depicts low-speed, cage rotor 420 torque $T_2$ [Nm] and high-speed, inner rotor 430 torque $T_1$ [Nm] as a function of the low-speed cage rotor 420 angle [degrees] when operating at calculated peak torque value. It can be seen in FIG. 5 that the torque ripple is low.

Figure 6:
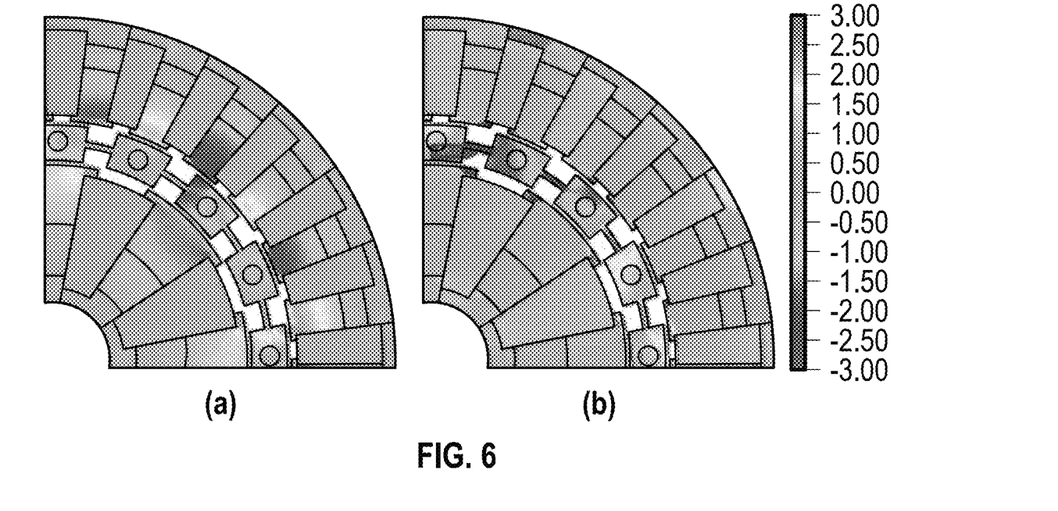
FIGS. 6a-6b depict (a) radial flux density $B_r$ and (b) azimuthal flux density $B_\theta$ for the flux concentration Halbach design with reduced $B_r$ values.

The radial and azimuthal magnetic flux density within the FCH-MG 400 is shown in FIG. 6. Particularly, 6(a) illustrates the radial flux density $B_r$ and 6(b) illustrates the azimuthal flux density $B_\theta$ for the flux concentration Halbach design with reduced $B_r$ values. The saturation within the ferromagnetic poles can be seen in FIG. 6(a), which indicates that the additional radial magnets greatly reduces the azimuthal flux leakage when compared to the usage of flux barrier holes (such as the axially disposed holes depicted on the outer cylinder in FIG. 2).

Figure 7:
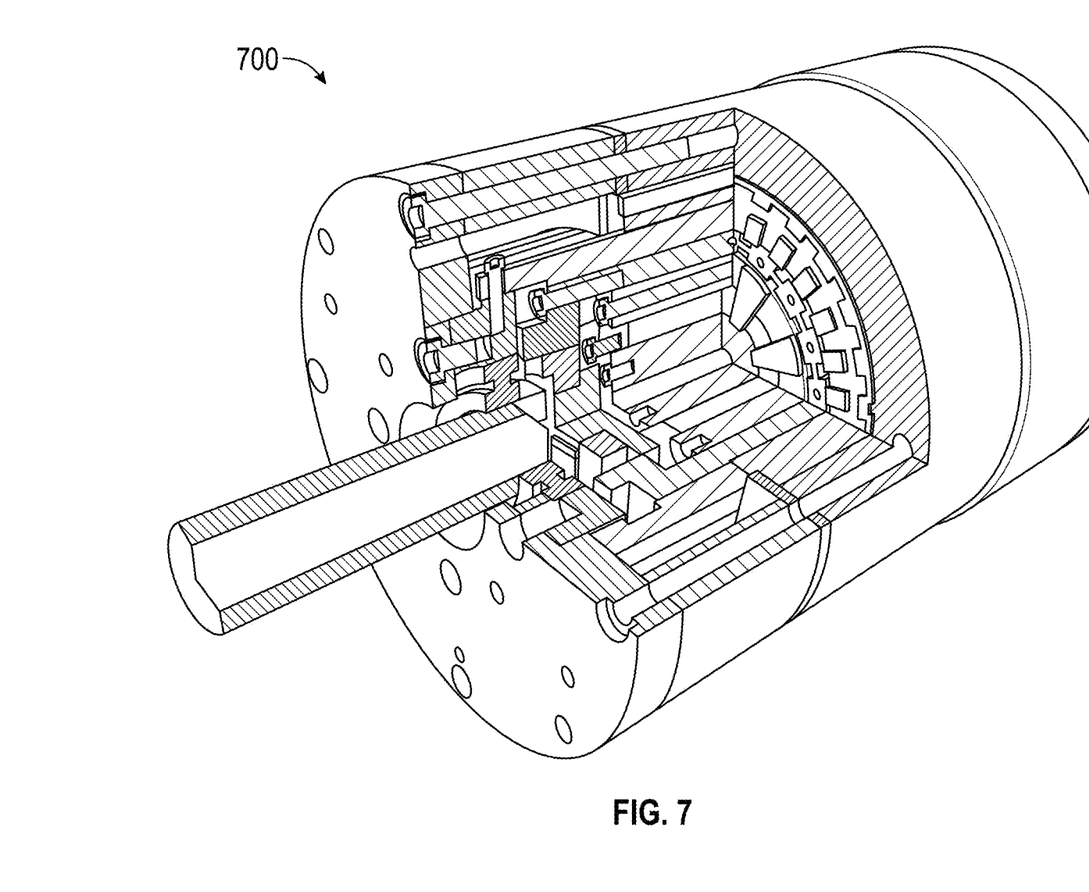
FIG. 7 is an image of a mechanical assembly of the flux concentration Halbach rotor magnetic gearbox.
Figure 8:
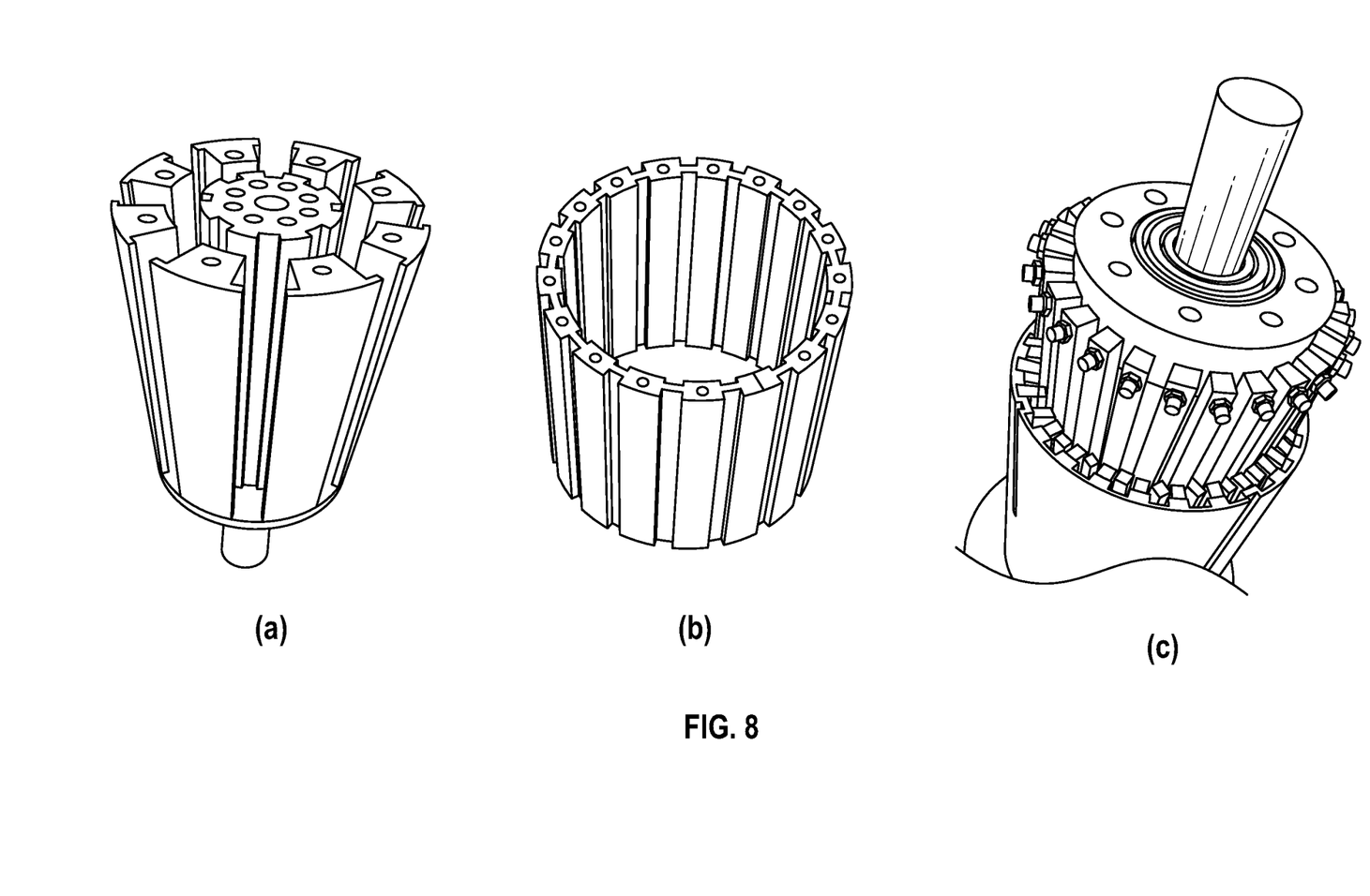
FIGS. 8a-8c are images of assembled (a) inner rotor ferromagnetic poles, (b) a low speed cage rotor and (c) an outer rotor assembly.
Figure 9:
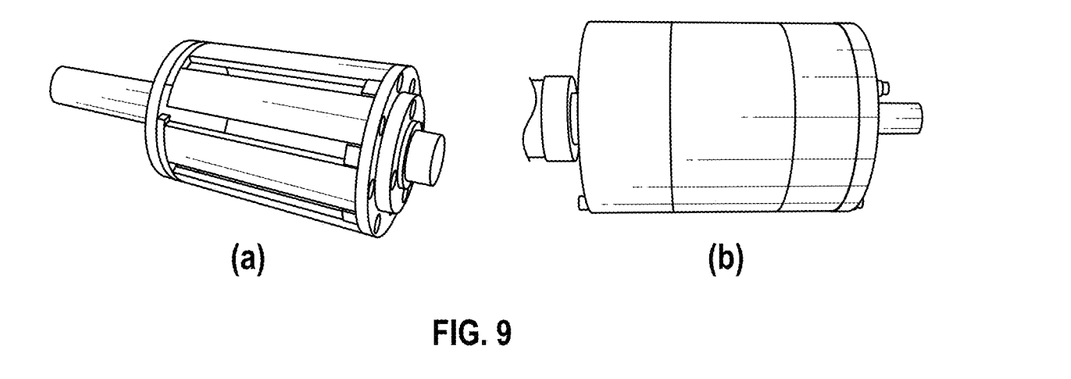
FIGS. 9a-9b are images of (a) a high-speed inner rotor assembly and (b) a fully assembled magnetic gearbox (MG).

An example mechanical assembly 700 of the flux concentration Halbach rotor magnetic gearbox FCH-MG 400 is illustrated in FIG. 7. For ease of description, components of the assembly 700 will be referred to using their corresponding reference number from FIG. 4. The central cage rotor 420 was made of laminations while the inner and outer rotor poles are made using solid ferromagnetic steel. Solid steel was used for some parts as the primary purpose of the analysis was to investigate the construction feasibility and peak torque density (but not high speed efficiency) of this example FCH-MG structure 700. The high-speed, inner rotor 430 ferromagnetic (steel) poles are shown in FIG. 8(a) and the laminated low-speed cage rotor 420 is shown in FIG. 8(b). The outer rotor 410 assembly is shown in FIG. 8(c). FIG. 9(a) illustrates the high-speed, inner rotor 430 assembly, and FIG. 9(b) illustrates the fully assembled FCH-MG structure.

Figure 10:
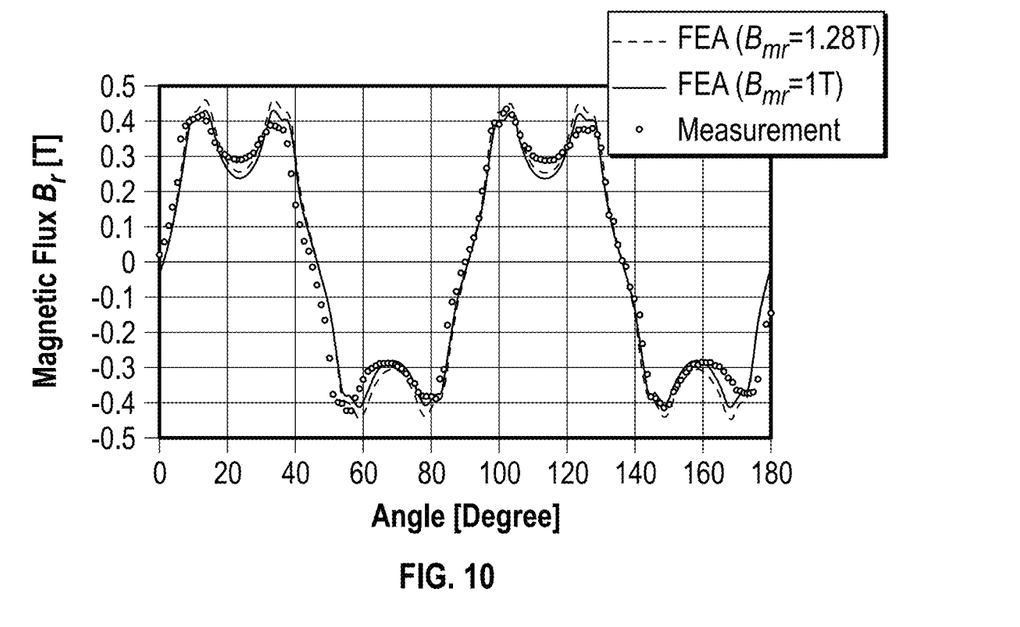
FIG. 10 is a graph of a measured inner rotor field at 1.3 mm above the rotor surface which is surrounded by air, and in addition, the calculated magnetic flux density field values when $B_{mr}=1.28$ T and $B_{mr}=1$ T.
Figure 11:
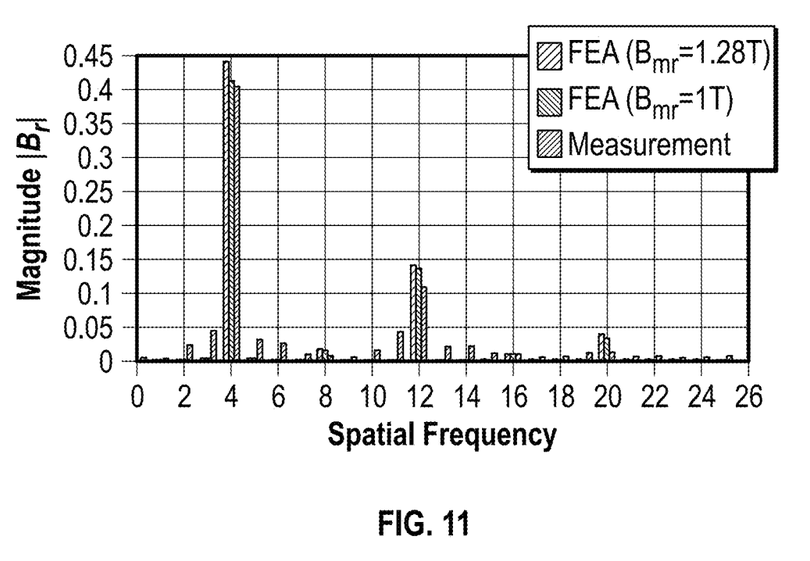
FIG. 11 is a graph of a spatial harmonic analysis of the inner rotor radial magnetic flux density when surrounded by air.
Figure 12:
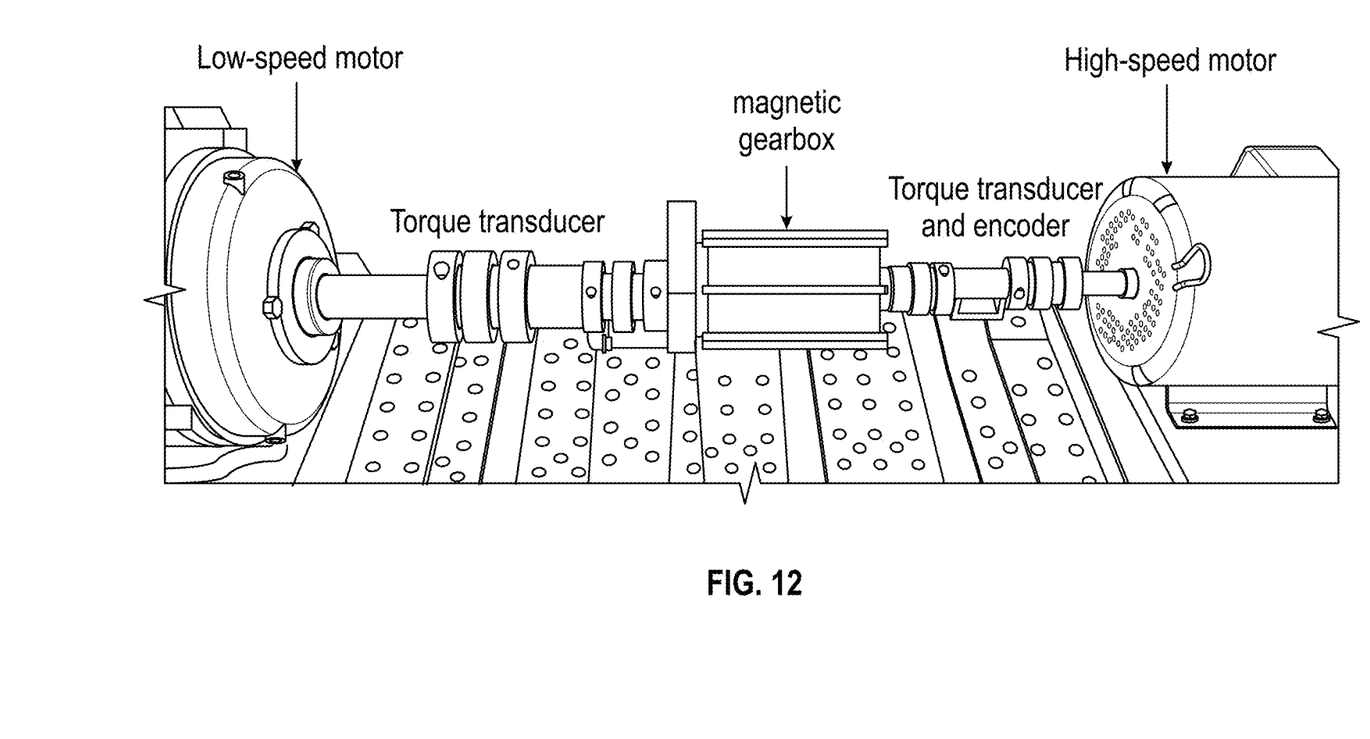
FIG. 12 is an image of an experimental test-stand for the flux concentration Halbach magnetic gearbox (FCH-MG).
Figure 13:
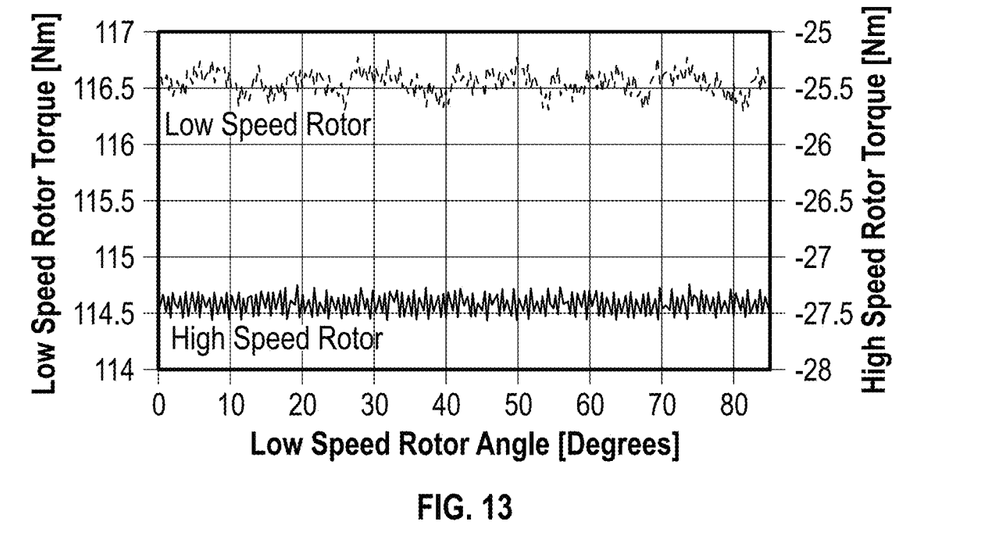
FIG. 13 is a graph illustrating torque as a function of low-speed rotor angle for the high and low speed rotors when operating at calculated peak torque, using reduced magnet residual flux density $B_{mr}$.
Figure 14:
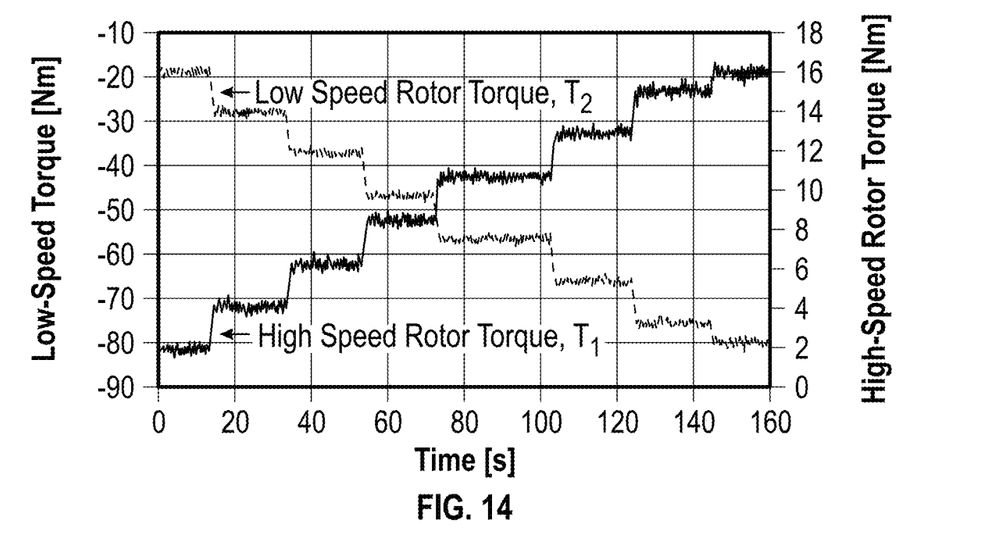
FIG. 14 is a graph illustrating experimentally measured torque and at different load levels.

The high-speed, inner rotor 430 field comparison, when surrounded by air at 1.3 mm, is shown in FIG. 10. FIG. 10 also depicts the calculated magnetic flux density field values when $B_{mr}$=1.28 T and $B_{mr}$=1 T. FIG. 11 depicts the spatial harmonic analysis of the high-speed, inner rotor 430 radial magnetic flux density when surrounded by air. It can be noted that the measured peak fundamental radial magnetic flux density value was $B_r$=0.4 T while the fundamental of the FEA calculated value was $B_r$=0.44 T. In order to match the torque values, the magnet's residual flux density value was reduced to $B_{mr}$=1 T. Using this reduced $B_{mr}$ value the MG torque was recalculated as shown in FIG. 13, which depicts low-speed, cage rotor 420 torque [Nm] and high-speed, inner rotor 430 torque [Nm] as a function of the low-speed, cage rotor 420 angle [degrees] at calculated peak torque, using reduced magnet residual flux density $B_{mr}$. The reduced residual flux density caused the calculated peak torque to reduce to $T_2$=116.5 Nm (152 Nm/L). The FCH-MG 700 was tested by making load step changes using the test setup shown in FIG. 12. The peak torque was measured to be $T_2$=82.8 Nm. This measured torque value is 27% lower than the expected (already reduced) torque value (shown in FIG. 13) and represents a measured torque density of only 112 Nm/L. One reason for the significantly lower torque value than expected is believed to be due to the need to pre-stress the outer rotor bars, shown in FIG. 8(c), so as to prevent them from making contact with the low-speed, caged rotor 420. It is suspected that this interaction may have caused intentional deflection in the bars that may have resulted in a larger than expected airgap.

III.C. Sizing Analysis

Figure 15:
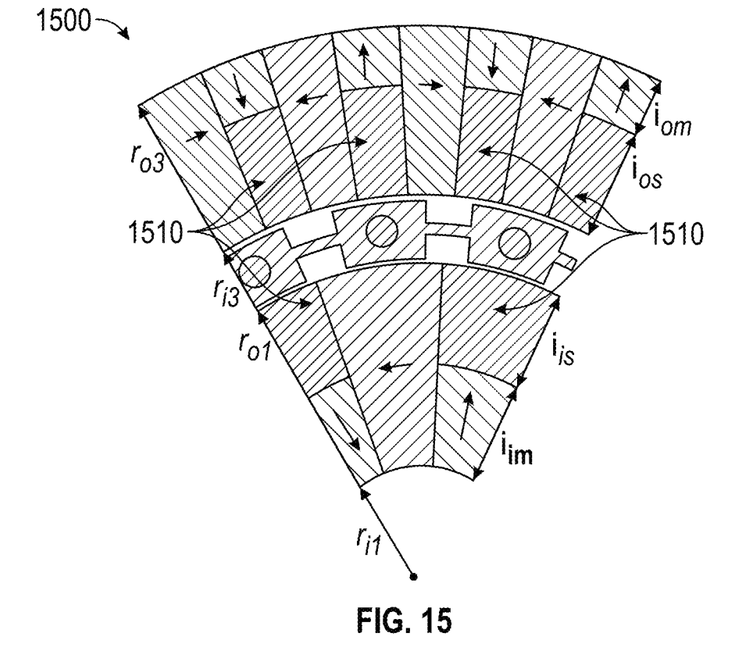
FIG. 15 is an illustration of an ideal model with dimensional definitions for the flux concentration Halbach magnetic gearbox (MG).

It was previously discussed that the inclusion of a ferromagnetic pole in front of the radial Halbach rotor magnet increased torque density. This increase may be caused by the effect of the steel pole concentrating the magnetic field, thereby increasing the flux density around the air-gap. In order to properly understand the effect of using the ferromagnetic rotor pole, an ideal MG topology as illustrated in FIG. 15 was studied, where the ferromagnetic rotor poles (here, made of steel) are shown in blue and at 1510. FIG. 15 depicts an ideal model with dimensional definitions shown for the flux concentration Halbach magnetic gearbox. This design does not contain any magnet retaining lips nor an additional back iron, and therefore enables the influence of the ferromagnetic rotor pole addition to be more clearly highlighted. Using the high-speed, inner rotor 430 magnet and steel pole lengths, as defined in FIG. 15, a scaling ratio can be defined as:

$$\Gamma_i = \frac{l_{im}}{l_{im} + l_{is}} \quad (7)$$

Similarly, an outer rotor magnet-steel scaling ratio can be defined as:

$$\Gamma_o = \frac{l_{om}}{l_{om} + l_{os}} \quad (8)$$

Figure 17:
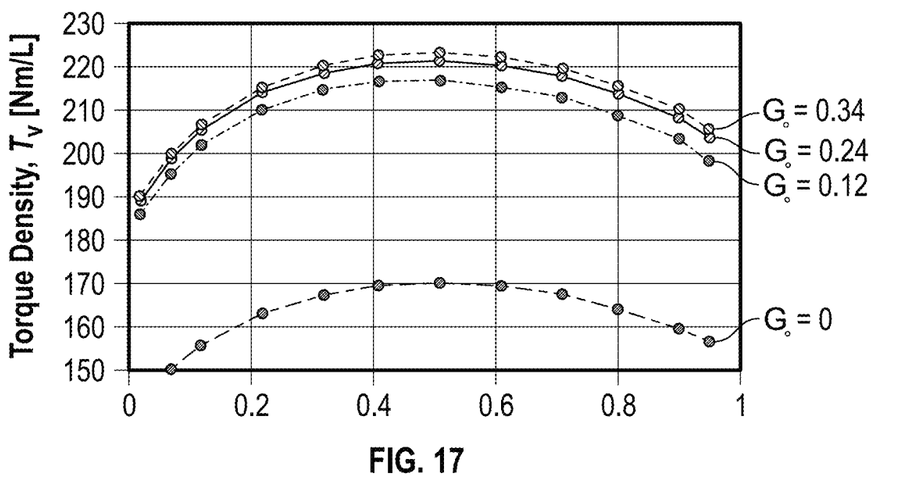
FIG. 17 is a graph illustrating various variations of volume torque density as a function of both an inner scaling ratio and an outer scaling ratio.

Using eqs. (7) and (8), the steel pole lengths were varied for the ideal MG design and the peak torque was computed as shown in FIG. 16. Specifically, FIG. 16 illustrates the influence of inner rotor scaling ratio, $\Gamma_i$ and outer rotor scaling ratio, $\Gamma_o$ on the peak torque. When $\Gamma_i=\Gamma_i=1$, the MG forms a 4 segment Halbach rotor MG. Alternatively, when $\Gamma_i=\Gamma_i=0$, the MG rotors become spoke-type or flux focusing in typology. It was determined that in this case the peak mass and volumetric torque density occurred near the center ($\Gamma_i$, $\Gamma_o$)=(0.5, 0.4). The torque and consequently torque density does not change significantly when the outer radial magnet ratio is $\Gamma_o>0.12$. This can be observed in FIG. 17, which is a plot of Torque density $T_v$ versus the inner radial magnet scaling ratio $\Gamma_i$; specifically, the variation of volume torque density as a function of both inner scaling ratio and outer scaling ratio. The scaling ratio does not significantly improve the torque density when $\Gamma_o>0.12$. Essentially, FIG. 17 shows that by adding only a small amount of radial magnet material to the outer rotor 110, 410, the torque density can be increased significantly. Further increases in the radial magnet length $l_{im}$, however, do not result is a very high percentage increase in torque density and increases beyond $\Gamma_o=0.4$ result in a decreased torque density.

IV. Conclusion

In view of the many possible embodiments to which the principles of the disclosed invention may be applied, it should be recognized that the illustrated embodiments are only preferred examples of the invention and should not be taken as limiting the scope of the invention.

What is claimed is:

1. A cylindrical magnetic gearing device comprising:
   an outer cylinder having an outer circumference and an inner circumference, comprising:
      a first plurality of magnetic pole pairs disposed along the outer cylinder, wherein the first plurality of magnetic pole pairs extends radially between the inner circumference and the outer circumference of the outer cylinder;
      a second plurality of magnetic pole pairs disposed along the outer circumference of the outer cylinder, each respective pole of the second plurality of magnetic pole pairs being interspersed between respective poles of the first plurality of magnetic pole pairs, wherein the polarities of the second plurality of magnetic pole pairs are substantially orthogonal to the polarities of the first plurality of magnetic pole pairs; and
      a first plurality of ferromagnetic pole pieces disposed along the inner circumference of the outer cylinder and interspersed between respective poles of the first plurality of magnetic pole pairs;
   an inner rotor having an outer circumference and an inner circumference, comprising:
      a third plurality of magnetic pole pairs disposed along the inner rotor, wherein the third plurality of magnetic pole pairs extends radially between the inner circumference and the outer circumference of the inner rotor;
      a fourth plurality of magnetic pole pairs disposed along the inner circumference of the inner rotor, each respective pole of the second plurality of magnetic pole pairs being interspersed between respective poles of the third plurality of magnetic pole pairs, wherein the polarities of the fourth plurality of magnetic pole pairs are substantially orthogonal to the polarities of the third plurality of magnetic pole pairs; and
      a second plurality of ferromagnetic pole pieces disposed along the outer circumference of the inner rotor and interspersed between respective poles of the third plurality of magnetic pole pairs; and
   a cage rotor disposed between the outer cylinder and inner rotor, and separated from the outer cylinder and inner rotor by air gaps, wherein a magnetic flux density in the air gaps is substantially confined by the first and second plurality of ferromagnetic pole pieces.

2. The device of claim 1, wherein each respective pole of the first plurality of magnetic pole pairs is evenly distanced by a first predetermined amount of space from respective neighboring poles of the first plurality of magnetic pole pairs.

3. The device of claim 1, wherein each respective pole of the third plurality of magnetic pole pairs is evenly distanced by a second predetermined amount of space from respective neighboring poles of the third plurality of magnetic pole pairs.

4. The device of claim 1, wherein the outer cylinder is stationary, the inner rotor is a high-speed rotor, and the cage rotor is a low-speed rotor.

5. The device of claim 1, wherein the outer cylinder contains a predetermined number of pole pairs $p_3$, the inner rotor contains a predetermined number of pole pairs $p_1$, and the cage rotor contains a discrete number of ferromagnetic poles $n_2$, where $n_2=p_1+p_3$.

6. The device of claim 5, wherein the torque ratio between the inner rotor and the cage rotor is given by $\omega_1=\omega_2(n_2/p_1)$.

7. The device of claim 1, wherein the first and second plurality of ferromagnetic pole pieces comprise iron.

8. The device of claim 1, further comprising a circular back iron disposed concentrically along the axis of the cylindrical magnetic gearing device, a portion of the back iron extending radially beyond an outer circumference of the first plurality of magnetic pole pairs.

9. The device of claim 1, further comprising a circular ferromagnetic ring disposed concentrically along the axis of the cylindrical magnetic gearing device, a portion of the circular ferromagnetic ring extending radially beyond an outer circumference of the first plurality of magnetic pole pairs.

* * * * *